United States Patent [19]

Udarbe et al.

[11] Patent Number: 6,107,256

[45] Date of Patent: *Aug. 22, 2000

[54] METHOD OF AND ADDITIVE FOR CONTROLLING FLUID LOSS FROM A DRILLING FLUID

[75] Inventors: Rebecca G. Udarbe, Garland; Kim Hancock-Grossi, Dallas; Charles R. George, Sachse, all of Tex.

[73] Assignee: Fritz Industries, Inc., Mesquite, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 09/141,681

[22] Filed: Aug. 27, 1998

[51] Int. Cl.⁷ .............................. C09K 7/02; C09K 7/00; E21B 33/13

[52] U.S. Cl. ..................... 507/120; 507/119; 507/121; 507/122; 507/123; 507/125; 523/130; 166/295

[58] Field of Search ............................ 507/123, 229, 507/121, 119, 125, 120, 122; 523/130; 166/295

[56] References Cited

U.S. PATENT DOCUMENTS

| | | | |
|---|---|---|---|
| 4,293,427 | 10/1981 | Lucas | 252/8.5 C |
| 4,547,299 | 10/1985 | Lucas | 252/8.5 C |
| 4,555,558 | 11/1985 | Giddings | 526/287 |
| 4,782,120 | 11/1988 | Rousset | 525/326.6 |
| 5,032,295 | 7/1991 | Matz | 252/8.51 |
| 5,099,930 | 3/1992 | Enrigtht | 175/65 |
| 5,600,044 | 2/1997 | Colle et al. | 507/123 |
| 5,855,244 | 1/1999 | Ahmed et al. | 507/123 |
| 5,988,279 | 11/1999 | Udarbe et al. | 166/295 |

FOREIGN PATENT DOCUMENTS 1-144452  12/1989  Japan .

*Primary Examiner*—Philip Tucker
*Attorney, Agent, or Firm*—Thomas R. Weaver

[57] ABSTRACT

This invention provides a composition for and a method of using the composition to reduce the loss of liquid from aqueous compositions employed while rotary drilling. The composition of this invention comprises a polymeric material selected from homopolymers, random copolymers and random terpolymers, each of which includes a vinylamide morpholine derivative in the recipe for making the polymeric material.

9 Claims, No Drawings

6,107,256

METHOD OF AND ADDITIVE FOR CONTROLLING FLUID LOSS FROM A DRILLING FLUID

BACKGROUND OF THE INVENTION

1. Field of the Invention

This invention broadly relates to the process of drilling boreholes which penetrate subsurface formations and, further, to aqueous compositions employed during the performance of the process. The invention still further relates to the process of rotary drilling and, particularly, to a method of, and a composition for, reducing the loss of liquid from aqueous compositions employed while rotary drilling.

2. Related Art and Problem Solved

It is well known in the art, that rotary drilling is a method useful to produce boreholes which penetrate subsurface formations which contain oil and/or gas, and that boreholes which do penetrate such formations are commonly referred to as oil and gas wells. It is also well known, that rotary drilling features the process of contacting an earthen formation with a bit, a tool having rigid cutters, i.e., "teeth," attached thereto, and causing the bit to penetrate the earthen formation, and subsequent formations, to produce a borehole which extends from the surface of the earth to some subsurface location. In broad terms, the bit is caused to penetrate an earthen formation by applying force against the formation with the bit while the bit rotates, whereby the bit cutters contact and abrade the formation.

In the performance of the process of rotary drilling, the bit is attached to the bottom of connected lengths of rigid, hollow pipe, called a drill string, wherein the diameter of the bit is greater than the outside diameter of the drill string. The drill string is suspended in the borehole by a surface structure, called a derrick. Machinery associated with the derrick operates to rotate the drill string in the borehole to, thus, cause the bit to rotate. As the bit rotates, some, or all, of the weight of the drill string above the bit is transferred to the formation to thereby generate the necessary cutting/abrading force against the formation. Accordingly, the cutters break small pieces of rock, called drill solids, from the formation which must be removed from the borehole in order to continue drilling. Aqueous compositions employed during the process operate, among other things, to remove the drill solids from the borehole.

Recall the earlier statement that the drill string is hollow. Accordingly, a water-based composition, called a drilling fluid, is pumped by equipment associated with the derrick from the surface down the hollow interior of the drill string to the bit. The drilling fluid exits the drill string through openings, or nozzles, in the bit and then returns to the surface by flowing in the annular space between the walls of the borehole and the exterior walls of the drill string. The process of pumping the drilling fluid from the surface down the interior of the drill string, through the bit and then back to the surface in the annulus is referred to as circulation.

The circulating drilling fluid functions to lubricate and cool the bit, to transport the previously mentioned drill solids from the borehole to the surface, and to seal the sides of the borehole to help prevent movement of water from the drilling fluid into the formations penetrated by the borehole. Upon being returned to the surface, the drilling fluid is processed, as is well known in the art, to remove drill solids therefrom and to add materials thereto. The added materials provide, or otherwise enhance, the ability of the drilling fluid to function as intended by contributing chemical and physical properties required by the drilling fluid to enable it to cope with and/or to resist environmental conditions encountered by the drilling fluid in the borehole.

An aqueous drilling fluid is a uniform liquid comprised of water, materials which are water soluble and materials which are not water soluble. The combination of components operates to produce properties essential to enable the drilling fluid to function as required. The water component may be fresh water, sea water or salt water. It is noted that "salt water" at least includes water that contains an appreciable quantity of sodium chloride dissolved therein, and water that contains an appreciable quantity of potassium chloride dissolved therein. The other components must be chemically and physically compatible with the water employed so as to produce a uniform fluid whose viscosity, plasticity and elasticity properties are sufficient to enable the fluid to suspend drill solids therein for transport to the surface for removal. While fluid viscosity is important, the fluid must not be so highly viscous as to require excessive pumping pressure to initiate and maintain circulation. The flow properties of a drilling fluid which involve elasticity, viscosity and plasticity are referred to in the art as rheological properties.

It is clear from the above, and well known in the art, that a drilling fluid is a carefully balanced combination of components which must operate together to stabilize the rheological properties of an aqueous drilling fluid. Rheological properties are, thus, influenced by many factors including, but not limited to: the chemical nature of the water itself; the component, or components, employed to alter fluid viscosity; materials employed to change the weight (density) of the fluid; materials employed to alter the acidity/alkalinity (pH) and salinity of the fluid; additives employed to prevent, control or at least diminish, the loss of water from the drilling fluid to formations penetrated by the borehole; drill solids produced during drilling; water produced by formations penetrated by the borehole; and the temperature and pressure of the borehole itself.

The water employed to make a drilling fluid may be fresh water, sea water or salt water. Fluid viscosity can be increased by use of materials which swell or thicken upon contact with the water. Such materials, referred to as viscosifiers, are known to include clays, such as bentonite, sepiolite and attapulgite, and polymers, such as cellulose derivatives. Fluid viscosity can be stabilized at desired values by use of materials, called thinners, which interfere with the ability of viscosifiers to increase viscosity. Examples of thinners include phosphates, polyphosphates, lignins and lignosulphonates. Weighting agents are, preferably, water insoluble materials, such as, barite. Materials employed to adjust pH and salinity, respectively include, alkali metal hydroxides, such as sodium hydroxide and alkali metal halides, such as, potassium and sodium chloride. It is known that drill solids can change the viscosity of a drilling fluid, and the effect of temperature and pressure on fluid viscosity is a well known phenomenon.

Water is a major, if not the principal, volume component of an aqueous drilling fluid. Consequently, loss of water from the drilling fluid, referred to as fluid loss and filtration loss, is a problem, long recognized by persons skilled in the art, to be considered when faced with the task of stabilizing the rheological properties of a drilling fluid. Accordingly, additives, referred to in the art as fluid loss and filtration control additives, employed to prevent, control or at least to diminish, the loss of water from drilling fluid to formations penetrated by the borehole, have been, and continue to be, the subject of extensive research and product development.

It has long been an object of research to develop compositions which operate in both fresh and salt water drilling fluids to control fluid loss at temperatures and pressures likely to be encountered in a borehole, wherein the compositions are compatible with other components of the drilling fluid and do not adversely effect the rheological properties of the drilling fluid. The following United States Patents, and items cited therein, propose solutions to problems associated with rotary drilling and drilling fluids and to various chemical compositions employed in achieving those solutions: U.S. Pat. Nos. 4,293,427; 4,547,299; 4,555,558; 4,782,120; 5,032,295; and 5,099,930. Thus, U.S. Pat. No. 5,032,295 discloses, among other things, that copolymers of sulfonated styreneitaconic acid improve the rheological properties of aqueous drilling fluids. Also, fluid loss additives consisting of copolymers of sulfonic methylacrylamido-alkyl acid and methylacrylamide and terpolymers of the sodium salt of 2-acrylamido-2-methylpropane sulphonic acid, N,N-dimethylacrylamide and acrylonitrile are disclosed in U.S. Pat. Nos. 4,782,120 and 4,555,558, respectively. Fluid loss additives are discussed in U.S. Pat. No. 4,547,299, one of which is a copolymer of a (meth)acrylamido alkyl sulfonic acid or alkali metal salts thereof and N,N-dialkyl(meth)acrylamide, wherein the copolymer can be cross-linked. The same patent also discloses the use of water soluble sulfonated polystyrene derivatives for filtration control. In addition, Japanese Patent document HEI 01[1989]-313584 discloses a terpolymer of 2-acrylamido-2-methylpropane sulfonate, N,N-dimethylacrylamide and acryloylmorpholine. The terpolymer is said to be useful as a drilling fluid conditioning agent which is stable under high temperature brine systems.

It is thus an object of this invention to provide a composition and a method of using the composition to control the loss of fluid from an aqueous drilling fluid which is exposed to a broad range of temperatures and pressures in a borehole.

It is another object of this invention to provide a composition useful to control fluid loss from an aqueous drilling fluid which is made with fresh water, sea water or salt water.

It is still another object of this invention to provide a fluid loss composition which will not operate to materially change the Theological properties of an aqueous drilling fluid and which is compatible with other components ordinarily present therein.

SUMMARY OF THE INVENTION

This invention provides a composition useful to stabilize the rheological properties of an aqueous drilling fluid and to reduce liquid loss from the drilling fluid to earthen formations in contact therewith. The composition is useful in drilling fluids made with fresh water, sea water or salt water at temperatures in the range of from about room temperature to about 500° F. and at pressure differentials up to about 1000 psig. Furthermore, the composition is compatible with additives ordinarily employed to make aqueous drilling fluids, and with materials, such as drill solids and foreign water, which intermix with the drilling fluid as a direct result of drilling operations. For purposes of this invention, the word "compatible" means that the composition will not cause the viscosity of the drilling fluid to experience a change sufficient to adversely effect the rheology of the drilling fluid, and the phrase "foreign water" means water produced from subterranean formations which are penetrated by the borehole.

In broad terms, the composition of this invention is a polymeric material selected from homopolymers, random copolymers and random terpolymers, each of which includes a vinylamide morpholine derivative in the recipe for making the polymeric material. Accordingly, when the polymeric material is a homopolymer, then the vinylamide morpholine derivative is the only polymerizable compound in the polymerization recipe. Furthermore, when the polymeric material is a random copolymer, then the polymerization recipe includes the vinylamide morpholine derivative and a second polymerizable material, wherein the second polymerizable material can contain a sulfonate group in its chemical structure. Still further, when the polymeric material is a random terpolymer, then the polymerization recipe includes the vinylamide morpholine derivative, a second polymerizable material and a third polymerizable material, wherein the second polymerizable material and the third polymerizable are different compounds, but each can contain a sulfonate group in its chemical structure.

This invention also provides a method of controlling the fluid loss from and stabilizing the rheological properties of an aqueous drilling fluid in the presence of high temperature and high pressure, comprising adding the composition of this invention to the drilling fluid prior to exposing the fluid to high temperature and high pressure.

It is believed that an effective amount of composition required to control fluid loss is an amount in the range of from about 0.1 to about 4.0 and preferably from about 0.5 to about 2.0 percent of the composition by weight of drilling fluid.

DESCRIPTION OF THE PREFERRED EMBODIMENTS

This invention provides a composition and a method of using the composition to stabilize the rheological properties of an aqueous drilling fluid and to reduce fluid loss from the fluid to earthen formations in contact therewith. The composition is a polymeric material selected from homopolymers, random copolymers and random terpolymers, each of which includes a vinylamide morpholine derivative in the recipe for making the polymeric material.

Accordingly, when the polymeric material is a homopolymer, then the vinylamide morpholine derivative is the only polymerizable compound in the polymerization recipe.

Furthermore, when the polymeric material is a random copolmer, then the polymerization recipe includes the vinylamide morpholine derivative and a second polymerizable material selected from the group consisting of a vinylamide sulfonate derivative, a styrene sulfonate and a vinylacid derivative, wherein the vinylamide sulfonate derivative and styrene sulfonate are each polymerizable salts of a sulfonic acid and, therefor, each contains a sulfonate group in its chemical structure.

Still further, when the polymeric material is a random terpolymer, then the polymerization recipe includes the vinylamide morpholine derivative, a second polymerizable material and a third polymerizable material, wherein the second polymerizable material and the third polymerizable are different compounds, but each is a material selected from the group consisting of a vinylamide sulfonate derivative, a styrene sulfonate and a vinylacid derivative as mentioned above.

As mentioned, the composition of this invention can also be a random copolymer or a random terpolymer. Thus, a polymerizable salt of a sulfonic acid useful to form random copolymers and random terpolymers with a vinylamide morpholine derivative useful herein is preferably selected from compounds within the general groups consisting of ammonium, alkali metal and alkaline earth metal salts of styrene sulfonic acid, referred to herein as styrene sulfonic acid salts, and ammonium, alkali metal and alkaline earth metal salts of (meth)acrylamido alkyl sulfonic acid, referred to herein as acrylamido sulfonic acid salts. Furthermore, a polymerizable salt of a vinylacid derivative useful to form random copolymers and random terpolymers with a vinylamide morpholine derivative useful herein is preferably selected from compounds within the general groups consisting of vinyl phosphonic acid salts, vinylsulfonic acid salts and acrylic acid salts.

Accordingly, when the composition of this invention is a random copolymer, then the vinylamide morpholine derivative is polymerized with a compound which is either a styrene sulfonic acid salt or an acrylamido sulfonic acid salt or a salt of a vinylacid. Furthermore, when the composition of this invention is a random terpolymer, then the vinylamide morpholine derivative is simultaneously polymerized with two different compounds selected from the group consisting of an acrylamido sulfonate derivative, a styrene sulfonate and a salt of vinylacid as mentioned above.

For purposes of convenience, the vinylamide morpholine derivatives useful herein are sometimes referred to as the first compound or as compound one (1); the styrene sulfonic acid salts are sometimes referred to as the second compound or as compound two (2); the acrylamido sulfonic acid salts are sometimes referred to as the third compound or as compound three (3); and the vinylacid salts are sometimes referred to as the fourth compound or as compound (4).

The vinylamide morpholine derivatives useful herein are selected from compounds represented by the general formula:

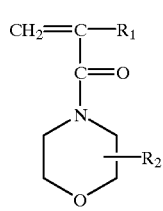

(1)

wherein $R_1$ is —H or —$CH_3$ and $R_2$ is —H, —$CH_3$ or —$CH_2CH_3$ and $R_2$ can be positioned on any one of the four carbons in the morpholine ring.

The polymerizable styrene sulfonic acid salts useful herein are selected from compounds represented by the general formula:

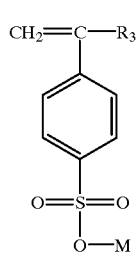

(2)

wherein $R_3$ is —H and M is —Na, —K, —$NH_4$, or —Ca½.

The polymerizable acrylamido sulfonic acid salts useful herein are selected from compounds represented by the general formula:

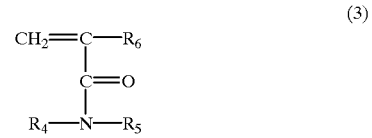

(3)

wherein $R_6$ is —H or —$CH_3$; $R_5$ is —H, —$CH_3$ or —$CH_2CH_3$; and $R_4$ is —$C(CH_3)_2CH_2SO_3X$ wherein X is —Na, —K, —$NH_4$ or —Ca½.

The polymerizable vinylacid derivatives useful herein are selected from compounds represented by the general formula:

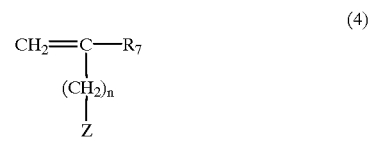

(4)

wherein $R_7$ is —H or —$CH_3$; Z is —$PO_3Y_2$, —$SO_3Y$ or —$CO_2Y$ and Y is —H, —Na, —K or —Ca½ and n has a value in the range of from about 0 to about 3.

Thus, in one aspect, the polymer composition of this invention is a random copolymer made by reacting a monomer selected from compounds within the scope of formula (1), the vinylamide morpholine derivative, with a monomer selected from compounds within the scope of formula (2), the styrene sulfonate, or with a monomer selected from compounds within the scope of formula (3), the vinylamide derivative, or with a monomer selected from compounds within the scope of formula (4), the vinylacid derivative.

In another aspect, the polymer composition is a random terpolymer made by reacting a vinylamide morpholine derivative, formula (1), with two different monomers selected from compounds within the scope of formulas (2), (3) and (4) wherein each of the two different monomer reactants is selected from a different vinyl-containing structure as defined in formulas (2), (3) and (4), above. For example, if one of the two different monomers is selected from compounds within the scope of formula (2), then the second monomer must be selected from compounds within the scope of either formula (3) or formula (4).

In a preferred embodiment, the polymer composition is a random copolymer made by reacting a monomer within the scope of formula (1) with a monomer within the scope of formula (2).

In another preferred embodiment the polymer composition is a random terpolymer made by reacting a monomer within the scope of formula (1) with a monomer within the scope of formula (2) and with a monomer within the scope of formula (3).

In still another preferred embodiment the polymer composition is a random terpolymer made by reacting a monomer within the scope of formula (1) with a monomer within the scope of formula (2) and with a monomer within the scope of formula (4).

As previously mentioned, the additive of this invention is a polymer composition comprising the random polymerization product of a vinylamide morpholine derivative with at least one and, up to two other different vinyl-containing monomers selected from monomers within the group consisting of a vinylamide derivative, a styrene sulfonate derivative and a vinylacid derivative. Accordingly, the polymer composition can be a random copolymer or a random terpolymer. The random copolymer is made by reacting a monomer selected from compounds within the scope of formula (1), the vinylamide morpholine derivative, with a monomer selected from compounds within the scope of formula (3), the vinylamide derivative, or formula (2), the styrene sulfonate derivative or with a monomer selected from compounds within the scope of formula (4), the vinylacid derivative. The random terpolymer is made by reacting a vinylamide morpholine derivative, formula (1), with two different monomers selected from compounds within the scope of formulas (2), (3) and (4) wherein each of the mentioned two different monomer reactants is selected from a different vinyl-containing structure as defined in formulas (2), (3) and (4), above.

It is noted that the polymer composition of this invention does not include a polymer made from all four of the defined structures.

Thus, the polymer composition of this invention consists of: random copolymers made from monomers within the scope of formulas (1) and (2), formulas (1) and (3) and formulas (1) and (4); and random terpolymers made from monomers within the scope of formulas (1), (2) and (3), formulas (1), (2) and (4) and formulas (1), (3) and (4).

In one preferred embodiment, the polymer composition of this invention consists essentially of the random copolymerization product of the vinylamide morpholine derivative and the vinylamide derivative, wherein $R_4$ is a propanesulfonate group, i.e., $R_4$=—$C(CH_3)_2CH_2SO_3X$, and $R_1$, $R_2$, and $R_3$ and $R_5$ are each hydrogen.

In another preferred embodiment, the polymer composition of this invention consists essentially of the random terpolymerization product of the vinylamide morpholine derivative, the vinylamide derivative and the vinylacid derivative, wherein Z is a phosphonic acid group, i.e., n=0 and Z=—$PO_3H_2$, or an acrylic acid group, i.e., n=1 and Z=—$CO_2H$, $R_4$ is a propanesulfonate group, i.e., $R_4$=—$C(CH_3)_2CH_2SO_3X$, and $R_1$, $R_2$, $R_3$, $R_5$ and $R_7$ are each hydrogen.

In still another preferred embodiment, the polymer composition of this invention consists essentially of the random terpolymerization product of the vinylamide morpholine derivative, and the vinylacid derivative, wherein m is 3 or 5, Z is a phosphonic acid group, i.e., n=0 and Z=—$PO_3H_2$, or an acrylic acid group, i.e., n=1 and Z=—$CO_2H$, and $R_1$, $R_2$, $R_6$ and $R_7$ are each hydrogen.

In still another preferred embodiment the reactants are acryloylmorpholine, sodium 2-acrylamido-2-methylpropanesulfonate and vinylphosphonic acid.

In one preferred embodiment, the composition of this invention is a homopolymer of the vinylamide morpholine derivative, wherein $R_1$ and $R_2$ are each hydrogen. In this embodiment the vinylamide morpholine derivative is acryloylmorpholine.

In another preferred embodiment, the composition of this invention is the random copolymerization product of the above mentioned vinylamide morpholine derivative and the acrylamido sulfonic acid salt, wherein $R_4$ is a propanesulfonic acid group, i.e., $R_4$=—$C(CH_3)_2CH_2SO_3X$, X is —$NH_4$ and $R_1$, $R_2$, $R_5$ and $R_6$ are each hydrogen. In this embodiment the vinylamide morpholine derivative is acryloylmorpholine and the acrylamido sulfonic acid salt is ammonium 2-acrylamido-2-methylpropanesulfonate.

In another preferred embodiment, the composition of this invention is the random copolymerization product of the above mentioned vinylamide morpholine derivative and the styrene sulfonic acid salt, wherein $R_1$, $R_2$, and $R_3$ are each hydrogen and M is Na. In this embodiment the vinylamide morpholine derivative is acryloylmorpholine and the styrene sulfonic acid salt is sodium styrene sulfonate.

In another preferred embodiment, the composition of this invention is the random terpolymerization product of the above mentioned vinylamide morpholine derivative, the acrylamido sulfonic acid salt and the styrene sulfonic acid salt, wherein $R_4$ is a propanesulfonic acid group, i.e., $R_4$=— $C(CH_3)_2CH_2SO_3X$, M is Na, X is Na and $R_1$, $R_2$, $R_3$, $R_5$ and $R_6$ are each hydrogen. In this embodiment the vinylamide morpholine derivative is acryloylmorpholine, the acrylamido sulfonic acid salt is sodium 2-acrylamido-2-methylpropanesulfonate and the styrene sulfonic acid salt is sodium styrene sulfonate.

The mole ratio of the total molar quantity of styrene sulfonate, vinylamide sulfonate derivative, and vinylacid derivative, as above defined (compound 2, compound 3 and compound 4), to the vinylamide morpholine derivative in the polymerization recipe of the composition of this invention is an amount in the range of from about 140 to about 1.4, preferably from about 97 to about 5.4, still more preferably from about 55 to about 9.4 and most preferably about 13.3 moles of the styrene sulfonate, vinylamide sulfonate derivative, and vinylacid derivative per mole of the vinylamide morpholine derivative. This range recognizes the situations involving copolymers and terpolymers as previously disclosed.

The preferred vinylamide morpholine derivative is acryloylmorpholine, the preferred acrylamido sulfonic acid salt is ammonium 2-acrylamido-2-methylpropanesulfonate, and the preferred styrene sulfonic acid salt is sodium styrene sulfonate.

Some specific compounds within the scope of formula (1) believed to be useful herein include acryloylmorpholine and methacryloylmorpholine.

Some specific compounds within the scope of formula (2) believed to be useful herein include sodium styrene sulfonate and ammonium styrene sulfonate.

Some specific compounds within the scope of formula (3) believed to be useful herein include ammonium 2-acrylamido-2-methylpropanesulfonate and sodium 2-acrylamido-2-methylpropanesulfonate.

Some specific compounds within the scope of formula (4) believed to be useful herein include vinyl phosphonic acid, acrylic acid and vinylsulfonic acid.

The composition of this invention is water soluble, and can be employed in an aqueous solution or in the solid (dry) state.

The composition of this invention is prepared by forming an aqueous solution of the disclosed polymerizable materials (the reactants) and causing them to react in the presence of an effective amount of a suitable water soluble initiator at atmospheric pressure and at a temperature in the range of from about 100 to about 200 degrees Fahrenheit. The total quantity of the disclosed reactants, in the combinations and mole ratios disclosed above, is present in the mentioned aqueous solution in an amount in the range of from about 5 to about 40, preferably about 7 to 35 and still more preferably from about 10 to about 30 moles of water per mole of reactants.

To obtain the water soluble composition of this invention having a molecular weight in the desired range, the mole ratio of the total number of moles of reactants in the reaction mass per mole of initiator is believed to be an amount in the range of from about 300 to about 400 wherein the reaction is conducted at the temperatures and pressure set out above.

Addition of initiator to the reaction mass is conveniently effected in water solution. For example, in one preferred embodiment featuring acryloylmorpholine and ammonium 2-acrylamido-2-methylpropanesulfonate, the initiator, ammonium persulfate, is added to the reaction mass in a 6 percent by weight aqueous solution. As such, when the total moles of the reactants, initiator and water are considered, active ammonium persulfate is present in an amount in the range of from about 7000 to about 8000 moles of reactants and water per mole of initiator.

The preferred initiator is ammonium persulfate and functional equivalents thereof as disclosed in U.S. Pat. No. 4,726,906.

EXAMPLES

The following examples are provided to illustrate a method of making the composition and a method of using the composition but not by way of limitation thereof.

Example 1

The drilling fluid additive of this invention was prepared in a glass container having a size sufficient to contain the volume of the ingredients. The container was equipped with a thermometer, a means for adjusting the temperature of the contents of the container, hereinafter sometimes referred to as the reaction mass, a mechanical stirring device, an addition funnel and ports for addition of liquid ingredients to the container.

The indicated quantity of D.I. Water was placed in the reaction vessel. The mixer was activated to stir at 130 rpm.

Thereafter, the entire quantity of ammonium hydroxide, in the form of an aqueous solution, was added to the water in the container, with continuous stirring, and allowed to dissolve therein. Then, the required quantity of AMPS was added to the reaction mass. AMPS and ammonium hydroxide react exothermically to produce the ammonium salt of AMPS. Accordingly, the operation of the temperature adjusting means and the addition rate of AMPS were coordinated to maintain the temperature of the reaction mass at a value in the range of from about 75 to about 80° F. The quantities of AMPS and ammonium hydroxide employed to produce the salt resulted in the reaction mass having a pH value in the range of from about 7 to about 7.7.

Next, the required quantity of ACMO was slowly added to the container with continuous mixing until completely dissolved.

The temperature of the reaction mass was adjusted to a value of about 114° F. and the ACMO and ammonium salt of AMPS were caused to react to form a polymer by rapidly adding to the reaction mass the entire quantity of an aqueous solution of ammonium persulfate initiator. The polymerization reaction proceeded for about 40 minutes until the temperature of the reaction mass stabilized at a value of about 180° F. which indicated the completion of the reaction.

The resulting polymer reaction product was in the form of a gelatinous mass which was dried to a solid material and then ground to a fine powder.

The recipe of ingredients employed in Example 1 is provided in Table 1, below. Please observe the Notes which follow Table 1.

TABLE 1

RECIPE FOR MAKING DRILLING FLUID ADDITIVE

| COMPONENT | WEIGHT GRAMS | MOLES | MOLE PERCENT | MOLES PER MOLE ACMO |
|---|---|---|---|---|
| WATER | 1388.19 | 77.0575 | 91.6205 | 303.3760 |
| NH$_4$OH as NH$_3$ | 58.00 | 3.4057 | 4.0493 | 13.4083 |
| AMPS | 700.00 | 3.3778 | 4.0162 | 13.2984 |
| ACMO | 36.00 | 0.2540 | 0.3020 | 1.0000 |
| AMMONIUM PERSULFATE | 2.31 | 0.0101 | 0.0120 | 0.0398 |
| TOTAL | 2184.50 | 84.1051 | 100.0000 | . . . |

Notes:
1. The water component includes 1210 grams of deionized water (D. I. water) initially added directly to the container, 142 grams added indirectly to the container as part of a 29% by weight aqueous ammonium hydroxide solution, and 36.19 grams added indirectly to the reaction mass as part of a 6% by weight aqueous ammonium persulfate solution.
2. AMPS is 2-acrylamido-2-methylpropane sulfonic acid.
3. ACMO is acryloylmorpholine.

Example 2

Several sea water and fresh water based fluids were prepared for testing. Some of the fluids did contain the polymer product of this invention and some, for purposes of comparison, did not. Recipes for the fluids are shown in Table 1A, below, wherein the fine ground polymer product produced in Example 1, above, is referred to as the additive.

TABLE 1A

RECIPE FOR MAKING DRILLING FLUID

| COMPONENT | | DRILLING FLUID | | | | |
|---|---|---|---|---|---|---|
| NAME | UNIT | 1 | 2 | 3 | 4 | 5 |
| Fresh Water | grams | 200.00 | 200.00 | 0.00 | 0.00 | 0.00 |
| Bentonite | grams | 150.00 | 150.00 | 150.00 | 150.00 | 150.00 |
| Sea Water | grams | 0.00 | 0.00 | 193.00 | 193.00 | 193.00 |
| NaOH | grams | 0.00 | 0.00 | 2.00 | 2.00 | 2.00 |
| Drill Solid | grams | 15.00 | 15.00 | 30.00 | 30.00 | 30.00 |
| ADDITIVE | grams | 0.00 | 6.00 | 0.00 | 3.00 | 6.00 |
| TOTALS | grams | 365.00 | 371.00 | 375.00 | 378.00 | 381.00 |
| Total Water | grams | 339.63 | 339.63 | 325.82 | 325.82 | 325.82 |
| Total Water | barrels | 0.97 | 0.97 | 0.93 | 0.93 | 0.93 |

NOTE:
1. Weights are expressed as grams of component per 350 milliliters. In this regard, it is conventional practice in the drilling fluids art to state that grams per 350 milliliters is equal to pounds per 42 gallons. Furthermore, in the drilling fluid art, 42 gallons is the volume of a barrel. Thus, for example, 200 grams per 350 milliliters is considered to be the equivalent of 200 pounds per barrel.
2. "Fresh Water" is tap water available in Mesquite, Texas.
3. "Sea Water" is simulated sea water, an aqueous solution consisting of 41.45 grams of a mixture of solids, referred to as "Sea Salt," per liter of aqueous solution. (See Section 8.8a of "Recommended Practice Standard Procedure for Laboratory Testing Drilling Fluids," API RP 13I, 4$^{th}$ Edition, June 1, 1990, at page 24.) The density of Sea Water is believed to be about 1.025 gms/ml at 15° C. "Sea Salt" is defined in ASTM D-1141-52, Formula A, Table 1, Section 1. Sea Salt consists, in percents by weight, of NaCl (58.49), MgCl$_2$.6H$_2$O (26.46), Na$_2$SO$_4$ (9.75), CaCl$_2$ (2.765), KCl (1.645), NaHCO$_3$ (0.477), KBr (0.238), H$_3$BO$_3$ (0.071), SrCl$_2$.6H$_2$O (0.095), NaF (0.007) and all other (0.002). It is commercially available from Lake Products Company of Ballwin, Missouri. The concentration of Sea Salt in Sea Water used in the recipe in Table 1A is believed to be about 4.04 percent Sea Salt by weight of Sea Water.
4. "Bentonite" is an aqueous suspension of bentonite clay prepared as set out in Section 8.7 of "Recommended Practice Standard Procedure for Laboratory Testing Drilling Fluids," API RP 13I, 4$^{th}$ Edition, June 1, 1990, at page 23. The recipe employed herein featured mixing, under high shear, 7000 grams of water and 520 grams of bentonite. The suspension simulates a fluid containing 26 pounds of bentonite per barrel of fluid.
5. "NaOH" is an aqueous solution consisting of 50% by weight sodium hydroxide.
6. "Drill Solid" is a mixture of solid materials which simulate solids produced as a result of drilling into a subsurface formation. The materials employed herein are identified as Rev-Dust available from The Milwhite Company, Houston, Texas. See API RP 13I, 4$^{th}$ Edition, June 1, 1990, at page 22.

Test Procedure

The test fluids were prepared by combining the components shown in Table 1A in accordance with the following procedure.

The indicated quantity of bentonite was first added to a vessel of a size sufficient to contain the volume of the ingredients. Thereafter, the indicated quantity of water (fresh water or sea water as required) was added. Then, when the water was sea water, the indicated quantity of sodium hydroxide was added and thoroughly mixed with the bentonite and water to produce a uniform suspension. Then the indicated quantity of drill solid was thoroughly blended to produce a uniform suspension of the components.

The fluids identified in Table 1A were tested for rheological and fluid loss properties after first being hot rolled for a period of time. In this regard, a drilling fluid in actual use during the rotary drilling of a borehole penetrating subterranean earth formations is constantly being pumped down the hollow drill string from the surface to the drill bit, returned to the surface and, after reconditioning, again pumped down the drill pipe. This constant circulation may continue for a long period of time wherein the fluid is subjected to the temperature of the borehole. Hot rolling is, thus, a conventional procedure employed in the drilling fluid art which simulates the aging experienced by a drilling fluid while it is circulated during drilling.

Drilling fluids 1–5 were hot rolled at 150° F. for 16 hours prior to testing. The test results are provided in Table 1B. The rheological and fluid loss properties were determined at room temperature in accordance with "Recommended Practice Standard Procedure for Field Testing Water-Based Drilling Fluids," API RP 13B-1, First Edition, Jun. 1, 1990.

Drilling fluids 1 and 2 were hot rolled at 400° F. for 16 hours prior to testing. The test results are provided in Table 1C. The rheological properties were determined at 120° F. in accordance with API RP 13B-1.

Drilling fluids 3, 4 and 5 were hot rolled at 250° F. for 16 hours prior to testing. The test results are provided in Table 1D. The Theological and fluid loss properties were determined at 120° F. in accordance with API RP 13B-1.

TABLE 1B

FLUIDS HOT ROLLED AT 150° F. for 16 HOURS before testing
Test Temperature: Room Temperature~77° F.

| PROPERTY | | DRILLING FLUIDS | | | | |
|---|---|---|---|---|---|---|
| | | 1 | 2 | 3 | 4 | 5 |
| RHEOLOGY TESTS | | | | | | |
| 600 rpm | FANN reading | 10 | 124 | 16 | 42 | 79 |
| 300 rpm | FANN reading | 6 | 84 | 11 | 28 | 51 |
| 200 rpm | FANN reading | 5 | 67 | 9 | 22 | 40 |
| 100 rpm | FANN reading | 3 | 44 | 7 | 15 | 27 |
| 6 rpm | FANN reading | 2 | 8 | 6 | 7 | 9 |
| 3 rpm | FANN reading | 2 | 6 | 6 | 7 | 8 |
| Plastic Viscosity | centipoise | 4 | 40 | 5 | 14 | 28 |
| Yield Point | lb/100 ft$^2$ | 2 | 44 | 6 | 14 | 23 |
| 10 sec gel | lb/100 ft$^2$ | 1 | 6 | 7 | 7 | 9 |
| 10 min gel | lb/100 ft$^2$ | 3 | 7 | 29 | 23 | 23 |
| FLUID LOSS IN 30 MINUTES | | | | | | |
| Filtrate, API | mls | 23.5 | 6.4 | 45 | 6.6 | 4.8 |

TABLE 1C

FLUIDS HOT ROLLED AT 400° F. for 16 HOURS before testing
Test Temperature: 120° F.

| PROPERTY | | DRILLING FLUIDS | |
|---|---|---|---|
| | | 1 | 2 |
| RHEOLOGY TESTS | | | |
| 600 rpm | FANN reading | 9 | 10 |
| 300 rpm | FANN reading | 8 | 7 |

TABLE 1C-continued

FLUIDS HOT ROLLED AT 400° F. for 16 HOURS before testing
Test Temperature: 120° F.

| PROPERTY | | DRILLING FLUIDS | |
|---|---|---|---|
| | | 1 | 2 |
| 200 rpm | FANN reading | 6 | 6 |
| 100 rpm | FANN reading | 5 | 5 |
| 6 rpm | FANN reading | 4 | 3 |
| 3 rpm | FANN reading | 4 | 3 |
| Plastic Viscosity | centipoise | 1 | 3 |
| Yield Point | lb/100 ft$^2$ | 7 | 4 |
| 10 sec gel | lb/100 ft$^2$ | 3 | 3 |
| 10 min gel | lb/100 ft$^2$ | 3 | 3 |
| FLUID LOSS IN 30 MINUTES | | | |
| Filtrate, HTHP, 400° F., 500 psi | mls | 103 | 48 |

TABLE 1D

FLUIDS HOT ROLLED AT 250° F. for 16 HOURS before testing
Test Temperature: 120° F.

| PROPERTY | | DRILLING FLUIDS | | |
|---|---|---|---|---|
| | | 3 | 4 | 5 |
| RHEOLOGY TESTS | | | | |
| 600 rpm | FANN reading | 20 | 57 | 91 |
| 300 rpm | FANN reading | 19 | 51 | 72 |
| 200 rpm | FANN reading | 18 | 48 | 67 |
| 100 rpm | FANN reading | 17 | 47 | 59 |
| 6 rpm | FANN reading | 20 | 48 | 51 |
| 3 rpm | FANN reading | 23 | 49 | 56 |
| Plastic Viscosity | centipoise | 1 | 6 | 19 |
| Yield Point | lb/100 ft$^2$ | 18 | 45 | 53 |
| 10 sec gel | lb/100 ft$^2$ | 18 | 35 | 60 |
| 10 min gel | lb/100 ft$^2$ | 24 | 45 | 73 |
| FLUID LOSS IN 30 MINUTES | | | | |
| Filtrate, HTHP, 250° F., 500 psi | mls | 118 | 28 | 16 |

Notes for Tables 1B, 1C and 1D:
FANN is the name of a commercially available instrument employed in the measurement of the rheological properties of fluids. A model 35A FANN instrument having a standard bob and spring was employed herein.

The results reported in Tables 1B, 1C and 1D reveal that drilling fluids 2, 4 and 5, which did include the additive of this invention, retained satisfactory rheological properties and experienced lower fluid loss in fresh water and salt water at low temperature and high temperature than did drilling fluids 1 and 3 which did not include the additive of this invention.

Example 3

Water based fluids containing potassium chloride were prepared for testing. Some of the fluids did contain the polymer product of this invention and some, for purposes of comparison, did not. Recipes for the fluids are shown in Table 1E, below, wherein the fine ground polymer product produced in Example 1, above, is referred to as the additive.

may continue for a long period of time wherein the fluid is subjected to the temperature of the borehole. Hot rolling is, thus, a conventional procedure employed in the drilling fluid art which simulates the ageing experienced by a drilling fluid while it is circulated during drilling.

Drilling fluid 11, identified in Table 1E, was tested for rheological and fluid loss properties after first being hot rolled for 16 hours at 150° F. and, thereafter, being permitted to remain in a static condition for 16 hours at 375° F. This procedure, referred to as static ageing, simulates the condition wherein circulation of a drilling fluid in a borehole is, for some reason, terminated and the fluid is exposed to the temperature of the borehole for a period of time.

TABLE 1E

RECIPE FOR MAKING DRILLING FLUID

| COMPONENT | | DRILLING FLUID | | | | | |
|---|---|---|---|---|---|---|---|
| NAME | UNIT | 6 | 7 | 8 | 9 | 10 | 11 |
| Fresh Water | grams | 283.50 | 283.50 | 294.00 | 294.00 | 294.00 | 294.00 |
| Sepiolite | grams | 4.00 | 4.00 | 4.00 | 4.00 | 4.00 | 4.00 |
| Bentonite | grams | 4.00 | 4.00 | 8.00 | 8.00 | 8.00 | 8.00 |
| Attapulgite | grams | 4.00 | 4.00 | 0.00 | 0.00 | 0.00 | 0.00 |
| Mud Thinner | grams | 6.00 | 6.00 | 6.00 | 6.00 | 6.00 | 6.00 |
| CMC | grams | 0.00 | 0.00 | 0.25 | 0.25 | 0.25 | 0.25 |
| KCl | grams | 15.00 | 15.00 | 15.00 | 15.00 | 15.00 | 15.00 |
| KOH | grams | 1.25 | 1.25 | 1.50 | 1.50 | 1.50 | 1.50 |
| Barite | grams | 220.00 | 220.00 | 250.00 | 250.00 | 250.00 | 250.00 |
| Drill Solids | grams | 15.00 | 15.00 | 20.00 | 20.00 | 20.00 | 20.00 |
| ADDITIVE | grams | 0.00 | 6.00 | 0.00 | 5.00 | 0.00 | 7.00 |
| TOTALS | grams | 552.75 | 558.75 | 598.75 | 603.75 | 605.75 | 605.75 |
| Total Water | pounds | 283.50 | 283.50 | 294.00 | 294.00 | 294.00 | 294.00 |
| Total Water | barrels | 0.81 | 0.81 | 0.84 | 0.84 | 0.84 | 0.84 |

NOTE:
1. Weights are expressed as grams of component per 350 milliliters. In this regard, it is conventional practice in the drilling fluids art to state that grams per 350 milliliters is equal to pounds per 42 gallons. Furthermore, in the drilling fluid art, 42 gallons is the volume of a barrel. Thus, for example, in drilling fluid 6, Table 1E, 283.50 grams per 350 milliliters is considered to be the equivalent of 283.50 pounds per barrel.
2. "Fresh Water" is tap water available in Mesquite, Texas.
3. "Sepiolite" is sepiolite clay.
4. "Bentonite" is bentonite clay.
5. "Attapulgite" is attapulgite clay.
6. "Mud Thinner" is a commercially available phosphonate.
7. "CMC" is carboxymethylcellulose.
8. "Kcl" is potassium chloride.
9. "KOH" is potassium hydroxide.
10. "Barite" is barium sulfate, a heavy, water insoluble, crystalline material.
11. "Drill Solid" is a mixture of solid materials which simulate solids produced as a result of drilling into a subsurface formation. The materials employed herein are identified as Rev-Dust available from The Milwhite Company, Houston, Texas. See API RP 131, 4th Edition, June 1, 1990, at page 22.

Test Procedure

The test fluids were prepared by combining the components shown in Table 1E in accordance with the following procedure.

The indicated quantity of fresh water was first placed in a vessel of a size sufficient to contain the volume of the ingredients. Thereafter, the indicated components were added in the order shown in Table 1E. Each component added was thoroughly mixed with the previous contents of the vessel to produce a uniform suspension prior to addition of the next component.

Drilling fluids 6–10, identified in Table 1E, were tested for rheological and fluid loss properties after first being hot rolled for 16 hours at 150° F. In this regard, a drilling fluid in actual use during the rotary drilling of a borehole penetrating subterranean earth formations is constantly being pumped down the hollow drill string from the surface to the drill bit, returned to the surface and, after reconditioning, again pumped down the drill pipe. This constant circulation The rheological and fluid loss properties of drilling fluids 6–11 were determined in accordance with "Recommended Practice Standard Procedure for Field Testing Water-Based Drilling Fluids," API RP 13B-1, First Edition, Jun. 1, 1990.

The test results are provided in Table 1F, below.

TABLE 1F

TEST TEMPERATURE: 120° F.

| | | DRILLING FLUIDS | | | | | |
|---|---|---|---|---|---|---|---|
| PROPERTY | | 6 | 7 | 8 | 9 | 10 | 11 |
| RHEOLOGY TESTS | | | | | | | |
| 600 rpm | FANN reading | 40 | 130 | 62 | 94 | 129 | 76 |
| 300 rpm | FANN reading | 40 | 81 | 68 | 53 | 79 | 44 |

TABLE 1F-continued

TEST TEMPERATURE: 120° F.

| PROPERTY | | DRILLING FLUIDS | | | | | |
|---|---|---|---|---|---|---|---|
| | | 6 | 7 | 8 | 9 | 10 | 11 |
| 200 rpm | FANN reading | 44 | 62 | 67 | 41 | 61 | 36 |
| 100 rpm | FANN reading | 46 | 41 | 72 | 25 | 39 | 25 |
| 6 rpm | FANN reading | 47 | 14 | 99 | 6 | 14 | 11 |
| 3 rpm | FANN reading | 15 | 13 | 23 | 4 | 13 | 11 |
| Plastic Viscosity | centipoise | 0 | 49 | −6 | 41 | 50 | 32 |
| Yield Point | lbs/100 ft$^2$ | 40 | 32 | 74 | 12 | 29 | 12 |
| 10 sec gel | lbs/100 ft$^2$ | 41 | 12 | 128 | 3 | 6 | 6 |
| 10 min gel | lbs/100 ft$^2$ | 61 | 18 | 161 | 8 | 14 | 10 |
| FLUID LOSS IN 30 MINUTES | | | | | | | |
| Filtrate, API | mls | — | — | 84 | 5.5 | 3.5 | 16.4 |
| Filtrate, HTHP, 375° F., 500 psi | mls | — | — | 154 (5 min) | 33.2 | 19.2 | 30 |
| Filtrate, HTHP, 400° F., 500 psi | mls | 150 (6 min) | 20 | — | — | — | — |

The results reported in Table 1F reveal that drilling fluids 7, 9, 10 and 11, which did include the additive of this invention, retained satisfactory rheological properties and experienced lower fluid loss in fresh water containing potassium chloride at low temperature and high temperature than did drilling fluids 6 and 8 which did not include the additive of this invention.

Example 4

The drilling fluid additive of this invention was prepared in equipment as described in Example 1, above.

The indicated quantity of D.I. Water was placed in the reaction vessel. The mixer was activated to stir at 130 rpm.

The indicated quantity of sodium styrene sulfonate was added to the reaction vessel.

Next, the required quantity of ACMO was slowly added to the container with continuous mixing until completely dissolved.

The temperature of the reaction mass was adjusted to a value of about 114° F. and the ACMO and sodium styrene sulfonate were caused to react to form a polymer by rapidly adding to the reaction mass the entire quantity of an aqueous solution of ammonium persulfate initiator. The water bath temperature was increased to 155° F. The polymerization reaction proceeded for about 40 minutes until the temperature of the reaction mass stabilized at a value of about 180° F. which indicated the completion of the reaction.

The resulting polymer reaction product was in the form of a gelatinous mass which was dried to a solid material and then ground to a fine powder.

The recipe of ingredients employed in Example 4 is provided in Table 2, below. Please observe the Notes which follow Table 2.

TABLE 2

RECIPE FOR MAKING DRILLING FLUID ADDITIVE

| COMPONENT | WEIGHT GRAMS | MOLES | MOLE PERCENT | MOLES PER MOLE ACMO |
|---|---|---|---|---|
| WATER | 153 | 8.4953 | 87.1885 | 7.1654 |
| Na Styrene Sulfonate | 12.66 | 0.0612 | 0.6281 | 0.0156 |
| ACMO | 168.00 | 1.1856 | 12.168 | 1.0000 |
| AMMONIUM PERSULFATE | 0.34 | 0.0015 | 0.0154 | 0.0013 |
| TOTAL | 334 | 9.7436 | 100.0000 | . . . |

Notes:
1. The water component includes 147.67 grams of deionized water (D. I. water) initially added directly to the container, and 5.33 grams added indirectly to the reaction mass as part of a 6% by weight aqueous ammonium persulfate solution.
2. Na Styrene Sulfonate is sodium styrene sulfonate.
3. ACMO is acryloylmorpholine.

Example 5

Fresh water based fluids were prepared for testing. Some of the fluids did contain the polymer product of this invention and some, for purposes of comparison, did not. Recipes for the fluids are shown in Table 2A, below, wherein the fine ground polymer product produced in Example 4, above, is referred to as the additive.

TABLE 2A

RECIPE FOR MAKING DRILLING FLUID

| COMPONENT | | DRILLING FLUID | |
|---|---|---|---|
| NAME | UNIT | 12 | 13 |
| Fresh Water | grams | 200.00 | 200.00 |
| Bentonite | grams | 150.00 | 150.00 |
| Mud Thinner | grams | 1.00 | 1.00 |
| Sea Water | grams | 0.00 | 0.00 |
| NaOH | grams | 0.00 | 0.00 |
| Drill Solid | grams | 15.00 | 15.00 |
| ADDITIVE | grams | 0.00 | 3.00 |
| TOTALS | grams | 366.00 | 369.00 |
| Total Water | grams | 339.63 | 339.63 |
| Total Water | barrels | 0.97 | 0.97 |

NOTE: See notes 1–6, Table 1A, above
7. "Mud Thinner" is commercially available from Fritz Industries, Inc., of Mesquite, Texas, under the trade mark SC-10.

Test Procedure

The test fluids were prepared by combining the components shown in Table 2A in accordance with the procedure set forth in Example 2, above. The fluids were tested for rheological and fluid loss properties after first being hot rolled for a period of time.

Drilling fluids 12 and 13 were hot rolled at 150° F. for 16 hours prior to testing and the rheological and fluid loss properties were determined at room temperature. The test results are provided in Table 2B.

Drilling fluids 12 and 13 were also hot rolled at 150° F. and 400° F., respectively, for 16 hours prior to testing. The rheological properties were determined at 120° F. The test results are provided in Table 2C.

TABLE 2B

FLUIDS HOT ROLLED AT 150° F. for 16
HOURS before testing
Test Temperature: Room
Temperature~77° F.
RHEOLOGY TESTS

| PROPERTY | | DRILLING FLUIDS | |
|---|---|---|---|
| | | 12 | 13 |
| 600 rpm | FANN reading | 7 | 161 |
| 300 rpm | FANN reading | 4 | 126 |
| 200 rpm | FANN reading | 3 | 113 |
| 100 rpm | FANN reading | 2 | 94 |
| 6 rpm | FANN reading | 1 | 51 |
| 3 rpm | FANN reading | 0.5 | 34 |
| Plastic Viscosity | centipoise | 3 | 35 |
| Yield Point | lb/100 ft$^2$ | 1 | 91 |
| 10 sec gel | lb/100 ft$^2$ | 2 | 33 |
| 10 min gel | lb/100 ft$^2$ | 1 | 33 |
| FLUID LOSS IN 30 MINUTES | | | |
| Filtrate, API | mls | 20 | 15 |

TABLE 2C

FLUIDS HOT ROLLED AT 400° F. for
16 HOURS before testing
Test Temperature: 120° F.
RHEOLOGY TESTS

| PROPERTY | | DRILLING FLUIDS | |
|---|---|---|---|
| | | 12 | 13 |
| 600 rpm | FANN reading | 6 | 17 |
| 300 rpm | FANN reading | 3 | 12 |
| 200 rpm | FANN reading | 2 | 9 |
| 100 rpm | FANN reading | 2 | 4 |
| 6 rpm | FANN reading | 1.5 | 2 |
| 3 rpm | FANN reading | 0.5 | 2 |
| Plastic Viscosity | centipoise | 3 | 5 |
| Yield Point | lb/100 ft$^2$ | 0 | 12 |
| 10 sec gel | lb/100 ft$^2$ | 1 | 2 |
| 10 min gel | lb/100 ft$^2$ | 1 | 2 |
| FLUID LOSS IN 30 MINUTES | | | |
| Filtrate, HTHP, 400° F., 500 psi | mls | 64 | 34 |

The results reported in Tables 2B and 2C reveal that drilling fluid 13, which did include the additive of this invention, retained satisfactory Theological properties and experienced lower fluid loss in fresh water at low temperature and high temperature than did drilling fluid 12 which did not include the additive of this invention.

Example 6

The drilling fluid additive of this invention was prepared in equipment as described in Example 1, above.

The indicated quantity of D.I. Water was placed in the reaction t vessel. The mixer was activated to stir at 130 rpm and then ammonium hydroxide and AMPS were added as set forth in Example 1.

Next, the required quantity of ACMO was slowly added to the container with continuous mixing until completely dissolved.

The indicated quantity of vinyl phosphonic acid was added to the reaction vessel and the pH of the reaction mass was adjusted by addition of the indicated quantity of sodium hydroxide.

The temperature of the reaction mass was adjusted to a value of about 114° F. and the ACMO, ammoniated AMPS and vinyl phosphonic acid were caused to react to form a polymer by rapidly adding to the reaction mass the entire quantity of an aqueous solution of ammonium persulfate initiator. The polymerization reaction proceeded for about 40 minutes until the temperature of the reaction mass stabilized at a value of about 180° F. which indicated the completion of the reaction.

The resulting polymer reaction product was in the form of a gelatinous mass which was dried to a solid material and then ground to a fine powder.

The recipe of ingredients employed in Example 6 is provided in Table 3, below. Please observe the Notes which follow Table 3.

TABLE 3

RECIPE FOR MAKING DRILLING FLUID ADDITIVE

| COMPONENT | WEIGHT GRAMS | MOLES | MOLE PERCENT | MOLES PER MOLE ACMO |
|---|---|---|---|---|
| WATER | 211.37 | 11.7330 | 86.3985 | 210.6463 |
| NH$_4$OH as NH$_3$ | 14.79 | 0.8685 | 6.3954 | 15.5925 |
| AMPS | 140.65 | 0.6787 | 4.9977 | 12.1849 |
| ACMO | 7.90 | 0.0557 | 0.4102 | 1.0000 |
| VPA | 10.00 | 0.0926 | 0.6819 | 1.6625 |
| NaOH | 6.00 | 0.1500 | 1.1045 | 2.6930 |
| AMMONIUM PERSULFATE | 0.36 | 0.0016 | 0.0118 | 0.0287 |
| TOTAL | 391.07 | 13.5801 | 100.0000 | ... |

Notes:
1. The water component includes 169.52 grams of deionized water (D. I. water) initially added directly to the container, 36.21 grams added indirectly to the container as part of a 29% by weight aqueous ammonium hydroxide solution, and 5.64 grams added indirectly to the reaction mass as part of a 6% by weight aqueous ammonium persulfate solution.
2. AMPS is 2-acrylamido-2-methylpropane sulfonic acid.
3. ACMO is acryloylmorpholine.
4. VPA is vinyl phosphonic acid.

Example 7

Several sea water and fresh water based fluids were prepared for testing. Some of the fluids did contain the polymer product of this invention and some, for purposes of comparison, did not. Recipes for the fluids are shown in Table 3A, below, wherein the fine ground polymer product produced in Example 6, above, is referred to as the additive.

TABLE 3A

RECIPE FOR MAKING DRILLING FLUID

| COMPONENT | | DRILLING FLUID | | | |
|---|---|---|---|---|---|
| NAME | UNIT | 14 | 15 | 16 | 17 |
| Fresh Water | grams | 200.00 | 200.00 | 0.00 | 0.00 |
| Bentonite | grams | 150.00 | 150.00 | 150.00 | 150.00 |
| Mud Thinner | grams | 2.00 | 2.00 | 2.00 | 2.00 |
| Sea Water | grams | 0.00 | 0.00 | 193.00 | 193.00 |
| NaOH | grams | 0.00 | 0.00 | 2.00 | 2.00 |
| Drill Solid | grams | 15.00 | 15.00 | 30.00 | 30.00 |
| ADDITIVE | grams | 0.00 | 3.00 | 0.00 | 3.00 |
| TOTALS | grams | 367.00 | 370.00 | 377.00 | 380.00 |
| Total Water | grams | 339.63 | 339.63 | 325.82 | 325.82 |
| Total Water | barrels | 0.97 | 0.97 | 0.93 | 0.93 |

NOTE: See notes 1–7, Table 2A, above.

Test Procedure

The test fluids were prepared by combining the components shown in Table 3A in accordance with the procedure set forth in Example 2, above. The fluids were tested for rheological and fluid loss properties after first being hot rolled for a period of time.

Drilling fluids 14, 15, 16 and 17 were hot rolled at 150° F. for 16 hours prior to testing and the rheological and fluid loss properties were determined at room temperature. The test results are provided in Table 3B.

Drilling fluids 14 and 15 were also hot rolled at 400° F. for 16 hours prior to testing and the rheological properties were determined at 120° F. The test results are provided in Table 3C.

TABLE 3B

FLUIDS HOT ROLLED AT 150° F. for 16 HOURS before testing
Test Temperature: Room Temperature~77° F.
RHEOLOGY TESTS

| PROPERTY | | DRILLING FLUIDS | | | |
|---|---|---|---|---|---|
| | | 14 | 15 | 16 | 17 |
| 600 rpm | FANN reading | 7 | 58 | 16 | 38 |
| 300 rpm | FANN reading | 4 | 35 | 11 | 22 |
| 200 rpm | FANN reading | 3 | 26 | 9 | 17 |
| 100 rpm | FANN reading | 2 | 16 | 7 | 11 |
| 6 rpm | FANN reading | 1 | 3 | 6 | 4 |
| 3 rpm | FANN reading | 5 | 2 | 6 | 3 |
| Plastic Viscosity | centipoise | 3 | 23 | 5 | 16 |
| Yield Point | lb/100 ft² | 1 | 12 | 6 | 6 |
| 10 sec gel | lb/100 ft² | 2 | 3 | 7 | 3 |
| 10 min gel | lb/100 ft² | 1 | 3 | 29 | 4 |
| FLUID LOSS IN 30 MINUTES | | | | | |
| Filtrate, API | mls | 20 | 6.5 | 45 | 6.5 |

TABLE 3C

FLUIDS HOT ROLLED AT 400° F. for 16 HOURS before testing
Test Temperature: 120° F.
RHEOLOGY TESTS

| PROPERTY | | DRILLING FLUIDS | |
|---|---|---|---|
| | | 14 | 15 |
| 600 rpm | FANN reading | 6 | 7 |
| 300 rpm | FANN reading | 3 | 4 |
| 200 rpm | FANN reading | 2 | 3 |
| 100 rpm | FANN reading | 2 | 2 |
| 6 rpm | FANN reading | 1.5 | 2 |
| 3 rpm | FANN reading | 0.5 | 2 |
| Plastic Viscosity | centipoise | 3 | 3 |
| Yield Point | lb/100 ft² | 0 | 1 |
| 10 sec gel | lb/100 ft² | 1 | 2 |
| 10 min gel | lb/100 ft² | 1 | 2 |
| FLUID LOSS IN 30 MINUTES | | | |
| Filtrate, HTHP, 400° F., 500 psi | mls | 64 | 13 |

The results reported in tables 3B and 3C reveal that drilling fluids 15 and 17, which did include the additive of this invention,

What is claimed is:

1. A method of controlling the loss of liquid from an aqueous drilling fluid comprising adding to said drilling fluid a composition selected from the group consisting of the copolymer or terpolymer product of the process of polymerizing a first compound and a polymerizable material selected from the group consisting of a second compound, a third compound, and a fourth compound;

wherein said composition is present in said drilling fluid in an amount in the range of from about 0.1 to about 4.0 percent of said composition by weight of said drilling fluid, and the mole ratio of the total molar quantity of said second compound, said third compound and said fourth compound to said first compound in the polymerization recipe of said composition is an amount in the range of from about 140 to about 1.4 moles per mole of said first compound; and wherein said first compound is a vinylamide morpholine derivative, said second compound is selected from the group consisting of ammonium, alkali metal and alkaline earth metal salts of styrene sulfonic acid, said third compound is selected from the group consisting of ammonium, alkali metal and alkaline earth metal salts of (meth)acrylamido alkyl sulfonic acid and said fourth compound is a derivative of a vinylacid selected from vinyl phosphonic acid, vinyl sulfonic acid, acrylic acid and salts thereof; and wherein said vinylamide morpholine derivative is selected from compounds represented by the general formula:

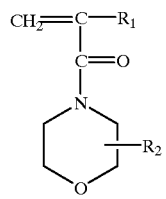

wherein $R_1$ is —H or —$CH_3$ and $R_2$ is —H, —$CH_3$ or —$CH_2CH_3$ and $R_2$ can be positioned on any one of the four carbons in the morpholine ring.

2. A method of controlling the loss of water from an aqueous drilling fluid to an earthen formation penetrated by a borehole, said method being comprised of the steps of:
mixing with said drilling fluid a composition in an amount effective to control the loss of said water from said drilling fluid to said earthen formation, and, thereafter, contacting said earthen formation with said drilling fluid;
wherein said composition is selected from the group consisting of the copolymer or terpolymer product of the process of polymerizing a first compound and a polymerizable material selected from the group consisting of a second compound, a third compound and a fourth compound, said composition is present in said drilling fluid in an amount in the range of from about 0.1 to about 4.0 percent of said composition by weight of said drilling fluid and the mole ratio of the total molar quantity of said second compound, said third compound and said fourth compound to said first compound in the polymerization recipe of said composition is an amount in the range of from about 140 to about 1.4 moles per mole of said first compound and
wherein said first compound is a vinylamide morpholine derivative, said second compound is selected from the group consisting of ammonium, alkali metal and alkaline earth metal salts of styrene sulfonic acid, said third compound is selected from the group consisting of ammonium, alkali metal and alkaline earth metal salts of (meth)acrylamido alkyl sulfonic acid and said fourth compound is a derivative of a vinylacid selected from vinyl phosphonic acid, vinyl sulfonic acid, acrylic acid and salts thereof; and further
wherein said vinylamide morpholine derivative is selected from compounds represented by the general formula:

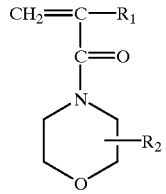

wherein $R_1$ is —H or —$CH_3$ and $R_2$ is —H, —$CH_3$ or —$CH_2CH_3$ and $R_2$ can be positioned on any one of the four carbons in the morpholine ring.

3. The method of claim 2 wherein said water is selected from fresh water, sea water, water containing sodium chloride and water containing potassium chloride.

4. An aqueous drilling fluid comprised of water, a viscosifier and a composition selected from copolymers and terpolymers prepared by the process of polymerizing a first compound with:
one polymerizable material selected from the group consisting of a second compound, a third compound and a fourth compound to thereby make said copolymer, or
two polymerizable materials selected from the group consisting of said second compound, said third compound and said fourth compound to thereby make said terpolymer;
wherein said composition is present in said drilling fluid in an amount in the range of from about 0.1 to about 4.0 percent of said composition by weight of said drilling fluid and
wherein the mole ratio of the total molar quantity of said second compound, said third compound and said fourth compound to said first compound in the polymerization recipe of said composition is an amount in the range of from about 140 to about 1.4 moles per mole of said first compound;
wherein said first compound is a vinylamide morpholine derivative, said second compound is selected from the group consisting of ammonium, alkali metal and alkaline earth metal salts of styrene sulfonic acid, said third compound is selected from the group consisting of ammonium, alkali metal and alkaline earth metal salts of (meth)acrylamido alkyl sulfonic acid and said fourth compound is a derivative of a vinylacid selected from vinyl phosphonic acid, vinyl sulfonic acid, acrylic acid and salts thereof; and
wherein said vinylamide morpholine derivative is selected from compounds represented by the general formula:

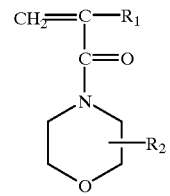

wherein $R_1$ is —H or —$CH_3$ and $R_2$ is —H, —$CH_3$ or —$CH_2CH_3$ and $R_2$ can be positioned on any one of the four carbons in the morpholine ring.

5. The drilling fluid of claim 4 wherein said composition is said polymer product of the process of polymerizing said vinylamide morpholine derivative and said third compound.

6. The drilling fluid of claim 5 wherein said vinylamide morpholine derivative is acryloylmorpholine and said third compound is ammonium 2-acrylamido-2-methylpropanesulfonate.

7. The drilling fluid of claim 4 wherein said composition is said polymer product of the process of polymerizing said vinylamide morpholine derivative and said second compound.

8. The drilling fluid of claim 7 wherein said vinylamide morpholine derivative is acryloylmorpholine and said second compound is sodium styrene sulfonate.

9. The drilling fluid of claim 4 wherein said water is selected from fresh water, sea water, water containing sodium chloride and water containing potassium chloride.

* * * * *